United States Patent [19]

Funaki et al.

[11] Patent Number: 5,250,359
[45] Date of Patent: Oct. 5, 1993

[54] COATING COMPOSITION AND RESIN MOLDED ARTICLE COATED THEREBY

[75] Inventors: Masaaki Funaki, Ichihara; Fujio Sawaragi, Kanagawa, both of Japan

[73] Assignee: Nippon ARC Co., Ltd., Japan

[21] Appl. No.: 984,507

[22] Filed: Dec. 2, 1992

Related U.S. Application Data

[62] Division of Ser. No. 749,749, Aug. 26, 1991, Pat. No. 5,191,045.

[30] Foreign Application Priority Data

Sep. 10, 1990 [JP] Japan ................................. 2-239419

[51] Int. Cl.$^5$ ............................................... B32B 9/04
[52] U.S. Cl. ....................................................... 428/447
[58] Field of Search ........................................... 428/447

[56] References Cited

U.S. PATENT DOCUMENTS

| | | | |
|---|---|---|---|
| 4,304,895 | 12/1981 | Loshaek | 526/316 |
| 4,380,643 | 4/1983 | Yoshida et al. | 526/259 |
| 4,439,291 | 3/1984 | Irving et al. | 526/316 |
| 4,508,882 | 4/1985 | Yoshida et al. | 526/259 |
| 4,612,358 | 9/1986 | Besecke et al. | 526/259 |
| 4,652,656 | 3/1987 | Besecke et al. | 526/259 |
| 4,845,180 | 7/1989 | Henry et al. | 526/259 |
| 5,026,806 | 6/1991 | Rehmer et al. | 526/316 |

FOREIGN PATENT DOCUMENTS

| | | | |
|---|---|---|---|
| 58-11563 | 1/1983 | Japan | 526/316 |
| 0084843 | 5/1983 | Japan | 526/316 |
| 60-20906 | 2/1985 | Japan | 526/279 |
| 60-258274 | 12/1985 | Japan | 526/279 |
| 62-135505 | 6/1987 | Japan | 526/279 |
| 63-37167 | 2/1988 | Japan | 526/279 |

*Primary Examiner*—Joseph L. Schofer
*Assistant Examiner*—N. Sarofim
*Attorney, Agent, or Firm*—Armstrong, Westerman, Hattori, McLeland & Naughton

[57] ABSTRACT

A coating composition for forming an undercoat layer, which contains a copolymer obtained from the following monomer compounds (i), (ii) and (iii), (i) an acrylic or methacrylic compound,
(ii) an alkoxysilyl group-containing acrylic or methacrylic compound and
(iii) an acrylic or methacrylic compound having ultraviolet light absorbability such as benzophenone-substituted acrylic monomer or triazole-substituted acrylic monomer, and a coated resin molded article coated with an undercoat layer of the above coating composition, and with an overcoat layer of an organopolysiloxane-containing coating composition.

3 Claims, No Drawings

COATING COMPOSITION AND RESIN MOLDED ARTICLE COATED THEREBY

This is a division of application Ser. No. 07/749,749, filed Aug. 26, 1991, now U.S. Pat. No. 5,191,045.

BACKGROUND OF THE INVENTION

1. Field of the Invention

The present invention relates to a coating composition excellent in weatherability and abrasion resistance, and a resin molded article coated with the composition.

2. Prior Art of the Invention

In general, polycarbonate resins are widely used as a transparent resin material due to their excellent impact resistance and transparency. However, polycarbonate resins have defects in that they are poor in abrasion resistance and solvent resistance and that the surface of a molded article produced therefrom is easily scratched and easily corroded with an organic solvent. In order to overcome these defects, there have been proposed a variety of methods in which such a molded article is coated with a thermosetting resin.

In order to improve the properties, abrasion resistance, etc., of transparent resin articles such as molded articles produced from the above polycarbonate resins, well known are resin articles which are coated, as an undercoat layer, with a coating composition comprising an acrylic polymer and further coated, as an overcoat layer, with a coating composition comprising either a silicon compound or a partial hydrolysis product of a silicon compound and a colloidal metal oxide composed mainly of colloidal silica (TOKKAI 59-109528(1984), etc.). And, the undercoat layer of an acrylic polymer often contains an ultraviolet light absorber in order to prevent crack and a decrease in adhesion to another coating layer, which occur due to photo-oxidative deterioration caused on an article surface by ultraviolet light.

However, such resin articles sometimes turn yellow, suffer cracks or have a coating layer peeled off under the influence of ultraviolet light, water, heat, etc., when used for a long period of time. These phenomena are caused for the following reason. When such resin articles are used for a long period of time, the ultraviolet light absorber migrates onto the coating layer surface and dissipates, i.e. it would not remain on the resin article surface, and the ultraviolet light absorption effect is gradually decreased.

Further, when there is employed a method such as an immersion method, a flow-coat method, or the like, in which an overcoating liquid for coating an undercoated resin article with an overcoat layer is repeatedly used, the ultraviolet light absorber contained in the undercoat layer is eluted into the overcoating liquid when brought into contact with the overcoating liquid, and the concentration of the ultraviolet light absorber in the overcoating liquid gradually increases. As a result, the resultant overcoating liquid shows defectiveness in hardness, a decrease in adhesion properties, etc., and the pot life of such an overcoating liquid decreases.

SUMMARY OF THE INVENTION

It is an object of the present invention to provide a coating composition for use on a weathering-resistant and abrasion-resistant resin molded article as an undercoat layer of a polymer having ultraviolet light absorbability, which composition prevents occurrence of crack and yellowing and a decrease in adhesion properties when the molded article is used for a long priod of time, and a resin molded article coated with an undercoat layer of the composition.

DETAILED DESCRIPTION OF THE INVENTION

The above object of the present invention is achieved by the following constitution. That is, according to the present invention, there is provided a coating composition for forming an undercoat layer, which contains a copolymer obtained from the following monomer compounds (i), (ii) and (iii), (i) an acrylic or methacrylic compound containing at least one of the compounds of the formulae (I) and (II),

wherein $R^1$ is hydrogen or a methyl group and $R^2$ is an alkyl group,

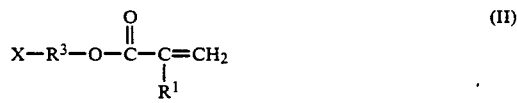

wherein $R^1$ is hydrogen or a methyl group, $R^3$ is an alkylene group, and X is a hydroxyl group, a carboxyl group, an amine group, an epoxy group, an amido group or $Si(OR^4)_3$ in which $R^4$ is an alkyl group, (ii) an alkoxysilyl group-containing acrylic or methacrylic compound of the formula (III),

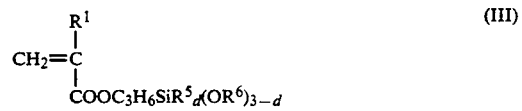

wherein $R^1$ is hydrogen or a methyl group, $R^5$ is a hydrocarbon group having 1 to 6 carbon atoms, $R^6$ is a hydrocarbon group having 1 to 5 carbon atoms, an alkoxyalkyl group or an acyl group having 1 to 4 carbon atoms, and d is 0, 1 or 2, and (iii) an acrylic or methacrylic compound having ultraviolet light absorbability.

According to the present invention, there is also provided a coated resin molded article obtained by coating a resin molded article with an undercoat layer of the above composition of the present invention and then with an overcoat layer of a coating composition containing organopolysiloxane.

In addition, the above (iii) acrylic or methacrylic compound having ultraviolet light absorbability, one component for forming an undercoat layer, is selected, for example, from a benzophenone-substituted acrylic monomer of the formula (IV),

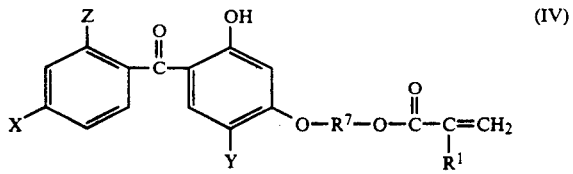

wherein $R^1$ is hydrogen or a methyl group, $R^7$ is an alkylene group —$(CH_2)_n$— in which n is 1 to 5 or a hydroxyalkylene group, Z is hydrogen, a hydroxyl group or a carboxyl group, X is hydrogen or an alkoxy group $OR^8$ in which $R^8$ is an alkyl group of $C_nH_{2n+1}$ in which n is 1 to 20, and Y is hydrogen, chlorine or a sulfonic acid group, and a triazole-substituted acrylic monomer of the formula (V),

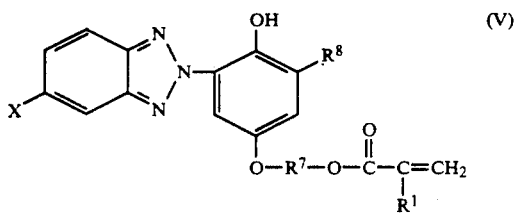

wherein $R^1$ is hydrogen or a methyl group, $R^7$ is an alkylene group —$(CH_2)_n$— in which n is 1 to 5 or a hydroxyalkylene group, $R^8$ is an alkyl group $C_nH_{2n+1}$ in which n is 1 to 20, and X is hydrogen or chlorine. These may be used alone or in combination.

In the coating composition for forming an undercoat layer, the copolymer is obtained from 5 to 85% by weight, preferably 30 to 70% by weight of the compound (i), 5 to 45% by weight, preferably 15 to 30% by weight of the compound (ii) and 10 to 50% by weight, preferably 15 to 40% by weight of the compound (iii).

When the amount of the compound (i) is less than 5% by weight, the adhesion to a molded article is poor, and when it exceeds 85% by weight, the adhesion to an overcoat layer is liable to decrease. When the amount of the compound (ii) is less than 5% by weight, the adhesion to an overcoat layer is poor, and when it is more than 45% by weight, the adhesion to a molded article is liable to decrease. When the amount of the compound (iii) is less than 10% by weight, no efficient effect on resistance to ultraviolet light can be expected, and when it is more than 50% by weight, the adhesion to a molded article is poor.

The compound of the formula (I) is selected, for example, from methyl (meth)acrylate, ethyl (meth)acrylate, propyl (meth)acrylate, butyl (meth)acrylate, etc.

The compound of the formula (II) is selected, for example, from hydroxyethyl (meth)acrylate, hydroxypropyl (meth)acrylate, hydroxymethylaminomethyl (meth)acrylate, dihydroxymethylaminomethyl (meth)acrylate, glycidoxypropyl (meth)acrylate, dimethylaminoethyl (meth)acrylate, diethylaminoethyl (meth)acrylate, dibutylaminoethyl (meth)acrylate, dimethylaminopropyl (meth)acrylate, etc.

The compound of the formula (III) is selected, for example, from γ-(meth)acryloxypropyltrimethoxysilane, γ-(meth)acryloxypropyltriethoxysilane, γ-(meth)acryloxypropylmethyldimethoxysilane, γ-(meth)acryloxypropylmethyldiethoxysilane, γ-(meth)acryloxypropyldimethylmethoxysilane, τ-(meth)acryloxypropyldimethylethoxysilane, etc.

The compound of the formula (IV) is selected, for example, from 2-hydroxy-4-(2-hydroxy-3-methacryloxy)propoxybenzophenone, 2-hydroxy-2'-carboxy-4(2-hydroxy-3-methacryloxy)propoxybenzophenone, 2,2'-dihydroxy-4-(2-hydroxy-3-methacryloxy)propoxybenzophenone, 2-hydroxy-4'-methoxy-4-(2-hydroxy-3-methacryloxy)propoxybenzophenone, 2-hydroxy-5-sulfonic-4-(2-hydroxy-3-methacryloxy)propoxybenzophenone, 2,2'-dihydroxy-4'-methoxy-4-(2-hydroxy-3-methacryloxy)propoxybenzophenone, etc.

The compound of the formula (V) is selected, for example, from 2-[2'-hydroxy-5'-(2-hydroxy-3-methacryloxy)propoxyphenyl]benzotriazole, 2-[2'-hydroxy-3'-tertbutyl-5'-(2-hydroxy-3-butyl-5'-(2-hydroxy-3-methacryloxy)propoxyphenyl]benzotriazole, 2-[2'-hydroxy-3'-tert-amyl-5'-(2-hydroxy-3-methacryloxy)-propoxyphenyl]benzotriazole, 2-[2'-hydroxy-3'-tertbutyl-5'-(2-hydroxy-3-methacryloxy)propoxyphenyl]-5-chlorobenzotriazole, 2-[2'-hydroxy-3'-di(1,1-dimethylbenzyl)-5'-(2-hydroxy-3-methacryloxy)propoxyphenyl]benzotriazole, etc.

The undercoat layer is generally obtained by drying a coating liquid of the composition under heat at a temperature between 80° C. and 130° C. for 15 minutes to 3 hours.

The thickness of the undercoat is preferably 0.2 to 15 μm, more preferably 0.5 to 10 μm. When this thickness is less than 0.2 μm, the weatherability is hardly improved. When it exceeds 15 μm, a crack easily occurs in a weathering test.

An organopolysiloxane-containing coating composition is suitably usable to form an overcoat layer. The organosiloxane-containing coating composition refers to a silicon compound-containing coating composition obtained by partially hydrolyzing a silanol compound of the formula (VI), $$R^8Si(OH)_3 \quad (VI)$$

wherein $R^8$ is an alkyl group having 1 to 3 carbon atoms, a vinyl group, a trifluoropropyl group, γ-glycidoxypropyl group, γ-aminopropyl group or γ-methacryloxypropyl group, in the presence of an aqueous or alcohol dispersion of colloidal metal oxide.

In addition to the above coating composition, a melamine-based resin and an acrylic resin may by used to form an overcoat layer. The thickness of the overcoat layer is preferably 1.0 to 8 μm, the most preferably 3 to 5 μm. When the overcoat layer thickness is less than 1.0 μm, the abrasion resistance is hardly improved. When it exceeds 8 μm, a crack is liable to occur easily.

The overcoat layer is generally obtained by drying a coating liquid of the above composition under heat at a temperature between 80° C. and 150° C. for 15 minutes to 5 hours. The above treatment conditions are selected depending upon the heat resistance of molded articles. The drying takes longer under heat at a lower temperature, and the time for the drying is decreased under heat at a higher temperature.

Further, the coating composition of the present invention may contain an ultraviolet light absorber and an antioxidant.

The coating composition of the present invention is mainly effective for molded articles of polycarbonate which is susceptible to photo-oxidative deterioration due to ultraviolet light, and it can be also applied to molded articles obtained, for example, from polyacryl(-heat-resistant acry), polyethylene terephthalate, polystyrene, an acrylonitrile/styrene copolymer, etc. Being excellent in transparency, the coating composition of the present invention is particularly suitable for coating articles of the above transparent resins.

The above coating composition for forming an undercoat layer is applied to the surface of a resin molded article, and the resultant coating layer is baked at a temperature lower than the thermal deformation temperature of the resin molded article or air-dried, whereby an undercoat layer is formed. Then, the above coating composition for forming an overcoat layer is applied onto the above undercoat layer, and cured.

EXAMPLES

Example 1

(a) Preparation of a coating liquid for an undercoat layer: Components (i), (ii) and (iii) were used in such a compositional ratio that the content of the component (i) was 70% by weight, that of the component (ii) was 20% by weight and that of the component (iii) was 10% by weight. That is, 78.4 g of methyl methacrylate [component (i)], 22.4 g of γ-acryloxypropyltrimethoxysilane [component (ii)], 11.2 g of 2-hydroxy-4-(2-hydroxy-3-methacryloxy)propoxybenzophenone [component (iii)] and 0.5 g of azobisisobutyronitrile were dissolved in 205 g of propylene glycol monomethyl ether, and under nitrogen atmosphere, the resultant mixture was stirred under heat at 85° C. for 4 hours to copolymerize the above components.

The resultant copolymer had a solid content of 35% and a viscosity of 1,000 cps. 100 Grams of propylene glycol monomethyl ether was added to 100 g of the copolymer to prepare a coating liquid for forming an undercoat layer.

(b) Preparation of a coating composition for an overcoat layer: 207 Grams of methyltrimethoxysilane and 7.0 g of acetic acid were added to 68.0 g of colloidal silica in solid (aqueous dispersion having a solid content of 34%), and the resultant mixture was stirred for hydrolysis for 2 hours while the temperature of the mixture was maintained at 50° C. Thereafter, 195 g of n-butanol, 195 g of isopropyl alcohol, 1.26 g of sodium acetate and 11.0 g of acetic acid were added to prepare a coating liquid for forming an overcoat layer.

The above coating liquid (a) for forming an undercoat layer was applied to a preliminarily washed polycarbonate substrate, air-dried for 15 minutes, and dried under heat at 125° C. in a hot-air drying furnace for 20 minutes. The dried undercoat layer had a thickness of 3.7 μm. Then, the above coating liquid (b) for forming an overcoat layer was applied to the undercoat layer surface of the polycarbonate substrate, air-dried for 15 minutes, and dried under heat at 125° C. in a hot-air drying furnace for 60 minutes. The dried overcoat had a thickness of 3.8 μm.

The resultant coated polycarbonate article had a transparent coating, and showed an abrasion resistance of A, an ahdesion of 100/100 and excellent water resistance. After it was subjected to a sunshine weatherometer test over 3,000 hours, it had an excellent appearance, an excellent hardness and excellent adhesion properties.

Further, when about 100 polycarbonate plates coated with the same undercoat layer as above were immersed in the same coating liquid for forming an overcoat as that used above, no decrease in adhesion properties was observed. The pot life of the coating liquid for forming an overcoat was also sufficient. In addition, the coating on an article was evaluated by the following methods.

Abrasion resistance: A #0000 steel wool was rubbed against a coating to examine ease and difficulty in forming scratch, and the results were evaluated as follows.

A: No scratch even if a coating was rubbed forcefully.

B: Scratched to a little extent when a coating was rubbed forcefully.

C: Scratched even when a coating was rubbed lightly.

Adhesion properties: A so-called crosscut test was carried out. A coating surface was cut 11 times lengthwise and 11 times widthwise at intervals of 1 mm each to form 100 squares, and a cellophane adhesive tape was applied to the crosscut section and peeled. The results were shown as a number of squares which had remained unpeeled among the 100 squares.

Water resistance: A coated article was allowed to stand in a warm water having a temperature of 60° C. for 7 days, and the coated article was examined with regard to failures such as whitening, a crack, peel, etc.

Accelerated weathering test: The weatherability of a coated article was evaluated with a sunshine carbon arc weatherometer. In addition, this test was conducted at a black panel temperature of 63°±3° C., and at a water spraying cycle of 12 minutes/hour.

Example 2

(a) Preparation of a coating liquid for forming an undercoat layer: Components (i), (ii) and (iii) were used in such a compositional ratio that the content of the component (i) was 60% by weight, that of the component (ii) was 20% by weight and that of the component (iii) was 20% by weight. That is, 63 g of ethyl methacrylate [component (i)], 21 g of γ-acryloxypropyltrimethoxysilane [component (ii)], 21 g of 2-[2'-hydroxy-3'-tert-butyl-5'-(2-hydroxy-3-methacryloxy)propoxyphenyl]benzotriazole [component (iii)] and 0.5 g of azobisisobutyronitrile were dissolved in 195 g of ethylene glycol monoethyl ether, and under nitrogen atmosphere, the resultant mixture was stirred under heat at 90° C. for 4 hours to copolymerize the components.

The resultant copolymerization product had a solid content of 35% and a viscosity of 900 cps. 400 Grams of ethylene glycol monoethyl ether was added to 100 g of the copolymer to prepare a coating liquid for forming an undercoat layer.

(b) Preparation of a coating liquid for forming an overcoat layer: 80 Grams of γ-glycidoxypropyltrimethoxysilane, 144 g of methyltrimethoxysilane, 15 g of colloidal silica in solid (aqueous dispersion having a solid content of 40%), and 170 g of a 1N hydrochloric acid aqueous solution were mixed, and the resultant mixture was refluxed at a temperature between 80° C. and 85° C. for 2 hours for hydrolysis. Then, 73 g of ethyl cellosolve and 1.3 g of ammonium perchlorate were added to 410 g of the resultant three-element hydrolysis solution to prepare a coating liquid for forming an overcoat layer.

The above coating liquid (a) for forming an undercoat layer was applied to a preliminarily washed polycarbonate substrate, air-dried for 15 minutes, and then dried under heat at 125° C. in a hot-air drying furnace for 15 minutes. The dried undercoat layer had a thickness of 0.8 μm. Thereafter, the coating liquid (b) for forming an overcoat layer was applied onto the undercoat layer on the polycarbonate substrate, air-dried for 15 minutes and then dried under heat at 125° C. in a hot-air drying furnace for 60 minutes. The dried overcoat layer had a thickness of 4.3 μm.

The resultant coated polycarbonate article was transparent, and showed an abrasion resistance of A, an adhesion of 100/100 and excellent water resistance. After it was subjected to a sunshine weatherometer test over 3,000 hours, it had an excellent appearance, an excellent hardness and excellent adhesion properties.

Comparative Example 1

Preparation of coating liquids for forming an undercoat layer: Copolymers having a composition shown in Table 1 was prepared in the same manner as in Example 1. 100 Grams of propylene glycol monomethyl ether was added to 100 g of each of the copolymers to prepare coating liquids for forming an undercoat layer. As a coating liquid (b) for forming an overcoat layer, the same coating liquid as that used in Example 1 was used.

The coating liquids for forming an undercoat layer were separately applied to preliminarily washed polycarbonate substrates, air-dried for 15 minutes and dried under heat at 125° C. in a hot-air drying furnace for 15 minutes in the same manner as in Example 1. All of the dried undercoat layers had a thickness of 3.7 μm. Then, the above coating liquid for forming an overcoat layer was applied onto each of the undercoat layers, air-dried for 15 minutes and dried under heat at 125° C. in a hot-air drying furnace for 60 minutes. All of the resultant overcoat layers had a thickness of 3.8 μm.

The above-obtained coated polycarbonate articles were defective in adhesion properties and water resistance as shown in Table 2.

TABLE 1

| Sample | Composition | Weight ratio | |
|---|---|---|---|
| A | MMA/APMS/HMPBP | 67/3/30 | (The content of 2nd component was smaller) |
| B | MMA/HMPBP | 80/20 | (No 2nd component was contained) |
| C | MMA/APMS/HMPBP | 10/10/80 | (The content of 3rd component was too large) |

MMA: methyl methacrylate
APMS: γ-acryloxypropyltrimethoxysilane
HMPBP: 2-hydroxy-4-(2-hydroxy-3-methacryloxy)propoxybenzophenone

TABLE 2

| Sample | Adhesion properties | Water resistance | |
|---|---|---|---|
| A | 20/100 | defective adhesion | 0/100 |
| B | 0/100 | defective adhesion | 0/100 |
| C | 0/100 | defective adhesion | 0/100 |

Adhesion test in water resistance is the same as adhesion test in Example 1.

Comparative Example 2

(a) Preparation of a coating liquid for forming an undercoat layer: 62 Grams of methyl methacrylate, 27 g of γ-acryloxypropyltrimethoxysilane and 0.4 g of azobisisobutyronitrile were dissolved in 160 g of ethylene glycol monoethyl ether, and under nitrogen atmosphere, the resultant mixture was stirred under heat at 90° C. for 4 hours to copolymerize the above components.

The resultant copolymerization product had a solid content of 30% and a viscosity of 850 cps. 328 Grams of ethylene glycol monoethyl ether and 7.5 g of 2,4-dihydroxybenzophenone (ultraviolet light absorber) were added to 100 g of the copolymer to prepare a coating liquid for forming an undercoat layer. As a coating liquid (b) for forming an overcoat layer, the same coating liquid as that used in Example 2 was used.

The above coating liquid (a) for forming an undercoat layer was applied to a preliminarily washed polycarbonate substrate, air-dried for 15 minutes, and then dried under heat at 125° C. in a hot-air drying furnace for 20 minutes. The dried undercoat layer had a thickness of 1.0 μm. Then, the above coating liquid (b) for forming an overcoat layer was applied onto the undercoat layer, air-dried for 15 minutes and dried under heat at 125° C. for 60 minutes. The dried overcoat layer had a thickness of 4.3 μm.

The resultant coated polycarbonate article was transparent and showed an abrasion resistance of A, an adhesion of 100/100 and good hot water resistance. However, when the coated polycarbonate article was subjected to a sunshine weatherometer test, it turned yellow extraordinarily after 2,000 to 2,500 hours, and cracks were partly observed.

Further, when about 100 polycarbonate plates coated with the same undercoat layer as above were immersed in the same coating liquid for forming an overcoat as that used above, the ultraviolet light absorber was eluted into the coating liquid. As a result, the resultant coated polycarbonate articles showed an abrasion resistance of B to C, and a decrease in the adhesion properties was also observed. It has been found that a decrease in the adhesion properties tends to occur when more than 2,500 ppm of the ultraviolet light absorber was eluted into the coating liquid for forming an overcoat layer.

Example 3

(a) Preparation of a coating liquid for forming an undercoat layer: 8.5 Grams of distilled water, 0.6 g of ammonium perchlorate and 400 g of propylene glycol monomethyl ether were added to 100 g of the same copolymer as that prepared in Example 1, and the resultant mixture was fully stirred to prepare a coating liquid for forming an undercoat layer.

(b) Preparation of a coating liquid for forming an overcoat layer: 207 Grams of methyltrimethoxysilane and 7.0 g of acetic acid were added to a mixture consisting of 54 g of colloidal silica and 14 g of a colloidal antimony oxide, and the resultant mixture was stirred for hydrolysis while the temperature of the mixture was maintained at 50° C. Thereafter, 195 g of n-butanol, 195 g of isopropyl alcohol, 1.26 g of sodium acetate and 11.0 g of acetic acid were added to the resultant hydrolysis product to prepare a coating liquid for forming an overcoat layer.

The above coating liquid (a) for forming an undercoat layer was applied to a preliminarily washed polycarbonate substrate, air-dried for 15 minutes, and dried under heat at 125° C. in a hot air drying furnace for 20 minutes. The dried undercoat layer had a thickness of 0.7 μm. Then, the above coating liquid (b) for forming an overcoat layer was applied onto the undercoat layer, air-dried for 15 minutes, and dried under heat at 125° C. in a hot-air drying furnace for 60 minutes. The dried overcoat layer had a thickness of 3.8 μm.

9

The resultant coated polycarbonate article was transparent, and showed an abrasion resistance of A, an adhesion of 100/100 and excellent water resistance. Further, after the coated polycarbonate article was subjected to a sunshine weatherometer test over 3,000 hours, it was excellent in appearance, hardness and adhesion properties.

Example 4

(a) Preparation of a coating liquid for forming an undercoat layer: Components (i), (ii) and (iii) were used in such a compositional ratio that the content of the component (i) was 60% by weight, that of the component (ii) was 15% by weight and that of the component (iii), benzophenone, was 25% by weight. That is, 96.9 g of methyl acrylate [component (i)], 24.2 g of γ-methacryloxypropyldimethylethoxysilane [component (ii)], 40.3 g of 2-hydroxy-4-(2-hydroxy-3-methacryloxy)-propoxy-5-sulfonic benzophenone [component (iii)] and 0.7 g of azobisisobutyronitrile were dissolved in 300 g of propylene glycol monomethyl ether, and under nitrogen atmosphere, the resultant mixture was stirred under heat at 80° C. for 5 hours to copolymerize the components.

The resultant copolymerization product had a solid content of 35% and a viscosity of 750 cps. 80 Grams of propylene glycol monomethyl ether was added to 100 g of the copolymer to prepare a coating liquid for forming an undercoat layer.

(b) Preparation of a coating liquid for forming an overcoat layer: 0.2 Gram of acetic acid was added to 68 g of colloidal silica in solid (aqueous dispersion having a solid content of 34%), and the mixture was stirred. Then, 138 g of methyltrimethoxysilane was added, and the resultant mixture was stirred for 2 hours for hydrolysis while the temperature of the mixture was maintained at 40° C. Thereafter, 145 g of n-butanol, 145 g of isopropyl alcohol, 1.2 g of sodium acetate and 10 g of acetic acid were added to the hydrolysis product to prepare a coating liquid for forming an overcoat layer.

The coating liquid (a) for forming an undercoat was applied to a preliminarily washed copolymer containing methyl methacrylate and N-methyl-dimethyl-glutarimide units (Pohm & Haas: KAMAX), air-dried for 15 minutes and dried under heat at 100° C. in a hot-air drying furnace for 1 hour. The dried undercoat had a thickness of 3.8 μm. Then, the above coating liquid (b) for forming an overcoat layer was applied onto the undercoat layer, air-dried for 15 minutes, and dried under heat at 120° C. in a hot-air drying furnace for 2 hours. The dried overcoat layer had a thickness of 4.0 μm.

The resultant coated above mentioned copolymer article was transparent, and showed an abrasion resistance of A, an adhesion of 100/100 and excellent water resistance. Further, after the coated above mentioned copolymer article was subjected to a sunshine weatherometer test over 3,500 hours, it was excellent in appearance, hardness and adhesion properties.

The foregoing description of preferred embodiments of the invention has been presented for purposes of description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplate. It is intended the scope of the invention be defined by the claims appended hereto, and their equivalents.

According to the present invention, the surface of a substrate is coated with an undercoat layer of an acrylic polymer having ultraviolet light absorbability. Therefore, the substrate is free from problems of elution and migration caused by water, heat, etc. Further, the prevention of photo-oxidative deterioration can be maintained when the substrate is used for a long period of time.

According to the present invention, the polymer having ultraviolet light absorbability is not eluted into a coating liquid for forming an overcoat layer since it is in the state of polymer. Therefore, the overcoating properties at an initial time can be maintained for a long period of time, and such an adverse effect as the decreasing of the pot life of a coating liquid for forming an overcoat layer can be prevented.

Further, the coating liquid for forming an undercoat layer, provided by the present invention, and a coating liquid for forming an overcoat layer, used in the present invention, can give coated molded articles having high abrasion resistance.

What is claimed is:

1. A resin molded article coated with an undercoat layer of a coating composition, which contains a copolymer obtained from the following monomer compounds (i), (ii), and (iii), (i) an acrylic or methacrylic compound containing at least one of the compounds of the formulae (I) and (II),

wherein $R^1$ is hydrogen or a methyl group and $R^2$ is an alkyl group,

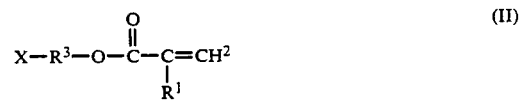

wherein $R^1$ is hydrogen or a methyl group, $R^3$ is an alkylene group, and X is a hydroxyl group, a carboxyl group, an amine group, an epoxy group, an amido group or $Si(OR^4)_3$ in which $R^4$ is an alkyl group, (ii) an alkoxysilyl group-containing acrylic or methacrylic compound of the formula (III),

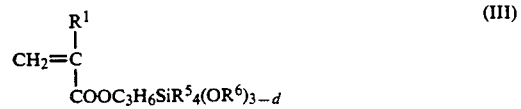

wherein $R^1$ is hydrogen or a methyl group, $R^5$ is a hydrocarbon group having 1 to 6 carbon atoms, $R^6$ is a hydrocarbon group having 1 to 5 carbon atoms, an alkoxyalkyl group or an acyl group having 1 to 4 carbon atoms, and d is 0, 1, or 2, and (iii) an acrylic or methacrylic compound having ultraviolet light absorbability selected from the group consisting of a benzophenone-substituted acrylic monomer of the formula (IV)

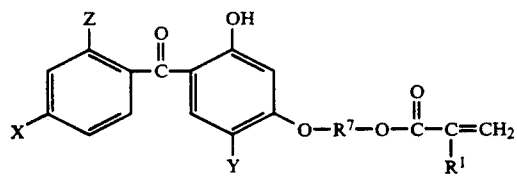
(IV)

wherein $R^1$ is hydrogen or a methyl group, $R^7$ is an alkylene group $(CH_2)_n$ in which n is 1 to 5 or a hydroxyalkylene group, Z is hydrogen, a hydroxyl group or a carboxyl group, X is hydrogen or an alkoxy group $OR^8$ in which $R^8$ is an alkyl group of $C_nH_{2n+1}$ in which n is 1 to 20, and Y is hydrogen, chlorine or a sulfonic acid group, and a triazole-substituted acrylic monomer of the formula (V),

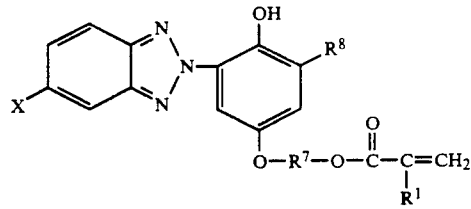
(V)

wherein $R^1$ is hydrogen or a methyl group, $R^7$ is an alkylene group $-(CH_2)_n$ in which n is 1 to 5 or a hydroxyalkylene group, $R^8$ is an alkyl group $C_nH_{2n+1}$ in which n is 1 to 20 and X is hydrogen or chlorine and with an overcoat layer of an organopolysiloxane-containing coating composition for forming an overcoat layer.

2. The resin molded article of claim 1, wherein monomer compound (i) comprises methyl acrylate.

3. The resin molded article of claim 1, wherein monomer compound (i) comprises methyl methacrylate.

* * * * *